J. F. BECKWITH.
Hub.
No. 27,611.  Patented Mar. 27, 1860.
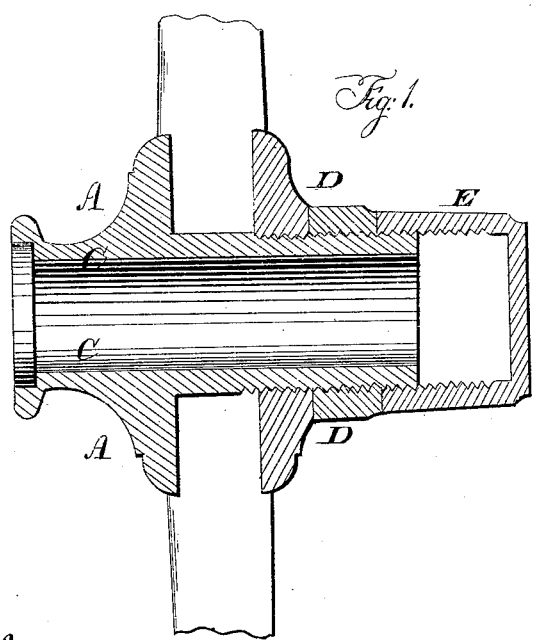
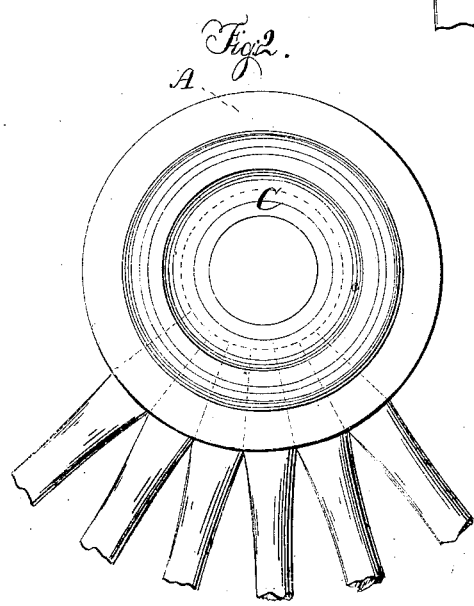
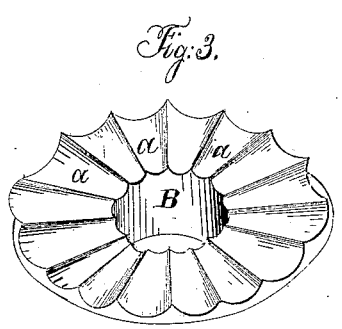

UNITED STATES PATENT OFFICE.

J. F. BECKWITH, OF SOUTH ALABAMA, NEW YORK.

HUB FOR CARRIAGE-WHEELS.

Specification of Letters Patent No. 27,611, dated March 27, 1860.

*To all whom it may concern:*

Be it known that I, J. F. BECKWITH, of South Alabama, in the county of Genesee and State of New York, have invented certain new and useful Improvements in Metallic Hubs, of which the following is a full, clear, and exact description, reference being had to the accompanying drawings, forming part of this specification, in which—

Figure 1 represents a longitudinal sectional elevation of a hub embracing my improvements. Fig. 2 represents a front elevation of the same, provided with spokes. Fig. 3 represents a perspective view of the movable flanch or collar, showing the grooves in which the edges of the spokes fit when secured to the hub.

My improvements in hubs relate to that class of metallic hubs in which the spokes are clamped separately between a stationary and movable flanch by means of a screw nut turning on the pipe box of the hub. The principal objection to this class of hubs as heretofore constructed is that the faces or sides of the tenons of the spokes which enter the hub, are separated by means of deep radial projections formed on and around the adjacent faces of the two flanches, their edges when clamped together coming in contact with the face of the opposite flanch, and form sockets in which the tenons of the spokes are made to fit, and are thus confined between the projection on one flanch and that on the opposite flanch. This mode of securing spokes to the hub renders it either necessary to employ smaller spokes than can be accommodated in the same size hub constructed on my improved plan, or to reduce the size of the tenon and form a shoulder on the end of each spoke, so that they will adjoin immediately above and around the periphery of the hub, which not only weakens the spoke at this point, but requires more labor and expense in the construction of wheels possessing no advantage over my improved method of securing spokes to hubs.

The object of my improvement in this class of hubs is to overcome these defects, and this I propose by clamping and securing the spokes to the hub separately between flanches so constructed that they will allow the faces or sides of the tenon of each spoke to adjoin continuously around the hub, by which means the necessity of reducing the size of the tenon and forming a shoulder on the end of each spoke is obviated thus overcoming a great objection in the mode of securing spokes separately between the flanches of the hub.

By reference to the accompanying drawings it will be seen that the nature of my invention for effecting this object consists in forming shallow radial grooves (*a a a*) in and around the adjacent faces of the stationary flanch A, formed on the pipe box C, and corresponding grooves in the movable flanch or collar B, in which the edges of the spokes closely fit when clamped between the flanches by turning the screw nut D on the pipe box, and are separately secured as firmly and durably as they would be if separated by the projections on the flanches entering between the tenons of the spokes, and extending to the face of the opposite flanch,—which admits of a greater number of spokes being employed in a given sized hub of this description than can be accommodated in those usually constructed for the same purpose; by which means not only is the strength and durability of the wheel increased, but the labor and expense of constructing the wheel greatly diminished. The stationary flanch A provided with grooves *a a a*, is cast in one piece with the pipe box C, and in connection with the movable flanch or collar B, which is provided with corresponding grooves, and adjusted by means of the screw nut D—forms the hub complete. A cap B screws on the end of the pipe box and serves to prevent the grease from running, and gives a finish to the hub.

It will be observed that the edges of the spokes are made to correspond with the shape of the grooves and when clamped between the flanches the spokes are separated one from the other by their edges closely fitting in these grooves, while the sides of their tenons adjoin continuously around the hub, which both admits of their being tightly wedged one by the other continuously around the hub, and of their being securely confined in their places, so that when necessary a spoke can be removed and replaced without displacing the whole. Thus it will be seen that my improved mode of securing spokes to hubs, not only facilitates in the construction of wheels, and in removing and replacing the spokes when necessary, but admits of a cheaper, stronger and more durable wheel being made than can be constructed by the employment of any of those hubs designed to secure spokes separately in their places.

Another great advantage to be derived from the use of my improved hub, in the construction of wheels, is effectually obviating the necessity of refitting the spokes to the hub, which is in a measure unavoidable where independent sockets are formed around the hub, as for instance, by the projection on the flanches which separate the spokes the entire width of their tenons; and this necessity is owing to difficulty experienced in casting the projections on the flanches of the same uniform thickness and depth, in which case it will be perceived, the sockets thus formed will vary in width as the projections vary in thickness, and the uniform size of the tenons, generally made by the same gage, must be altered to fit as many of the sockets as do not correspond with this gage.

I do not confine myself to any particular shape of groove, as thin shallow projections tapering outward to an edge, formed on and around the plain faces of the flanches, and radiating from their centers, will equally answer the purpose of separating the spokes on both sides, by entering a short distance between the corners of their tenons, and forming grooves corresponding in shape with the plain flat edge of the tenons which they accommodate and closely fit: the advantage of which is to give a neater finish to the spokes immediately above and around the periphery of the hub, than can be given to them when they are inserted between the flanches in round or oval grooves.

Having thus fully described my invention what I claim as new and desire to secure by Letters Patent is—

So constructing the two metallic plates A, A, which are provided with grooves, $a$, $a$, that they will clamp and hold the spokes, separate and distinct from each other on their edges, while they are allowed to bear and press against each other on their faces, substantially as and for the purpose specified.

JAMES F. BECKWITH.

Witnesses:
ANSON DE WOLF,
CHARLES BECKWITH.